F. SEPULCHRE.
PROCESS FOR PURIFYING BLAST FURNACE AND OTHER GASES.
APPLICATION FILED NOV. 2, 1908.
970,654.
Patented Sept. 20, 1910.
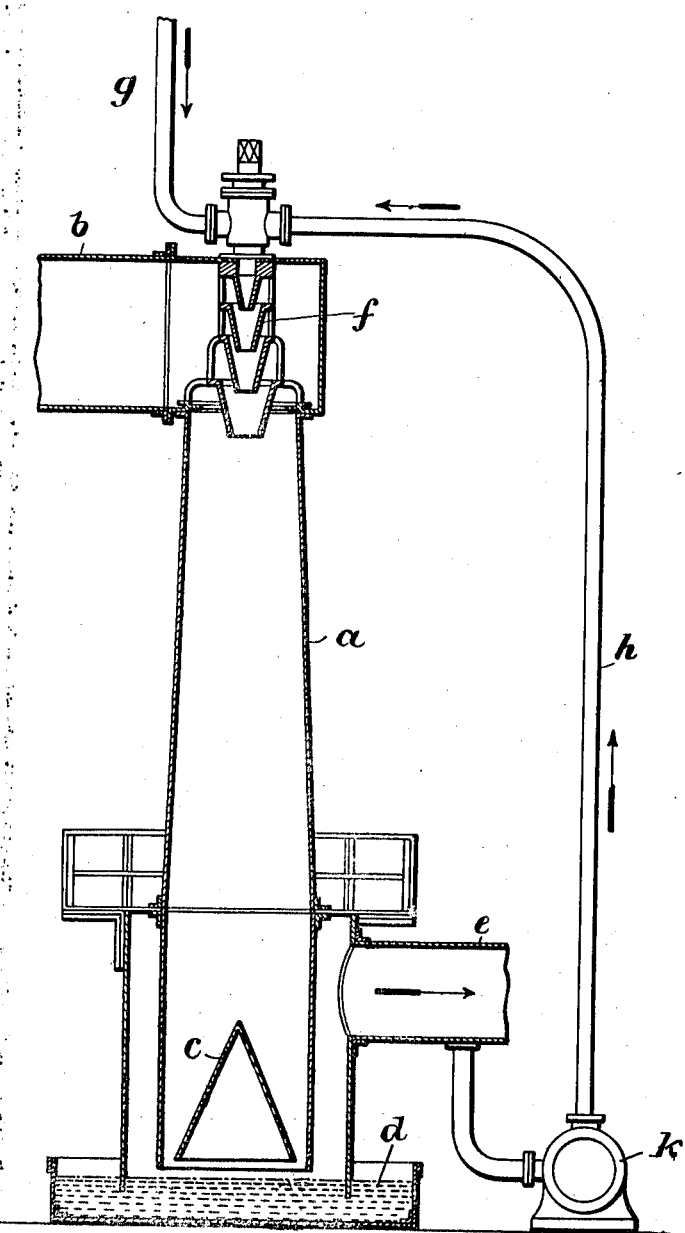

UNITED STATES PATENT OFFICE.

FRANÇOIS SEPULCHRE, OF LIEGE, BELGIUM.

PROCESS FOR PURIFYING BLAST-FURNACE AND OTHER GASES.

970,654.  Specification of Letters Patent.  Patented Sept. 20, 1910.

Original application filed January 6, 1908, Serial No. 409,520. Divided and this application filed November 2, 1908. Serial No. 460,781.

*To all whom it may concern:*

Be it known that I, FRANÇOIS SEPULCHRE, a subject of the King of the Belgians, residing at Liege, Belgium, have invented certain new and useful Improvements in Processes for Purifying Blast-Furnace and other Gases, of which the following is a specification.

The present invention relates to an improved method or process of purifying gases by removing therefrom impurities commonly found therein in either solid or liquid form; and is particularly adapted for treating heated gases such as are derived from blast furnaces for example. It has been customary to separate such impurities by injecting into a body of gas a spray produced by breaking a stream of water by contact with the walls of, or suitable plates or devices arranged in, the purifying apparatus, the fine particles of such spray acting to absorb more or less completely the solid or liquid impurities. This process however has not been entirely satisfactory when employed with gases having a relatively high temperature, because more or less of the water of the spray is vaporized by the heat and tends to saturate the gas, thereby reducing the calorific value thereof. Further, it has been necessary with the process heretofore proposed to employ some means in addition to the spray for removing the impurities from the body of gas, such for example as a body of liquid through which the gas is passed after being subjected to the action of a spray.

To avoid the objections incident to the processes heretofore employed the present invention contemplates forming the purifying spray, by bringing together streams of suitable liquid and gas both under such a pressure that the spray produced will effect a minute or complete division of the liquid as well as a thorough and intimate mixing of the particles of spray with the gas to be purified.

In the accompanying drawing there is illustrated more or less conventionally, in vertical section an apparatus adapted for carrying out the process of this invention and which apparatus forms the subject-matter of the application filed January 6, 1908, Serial Number 409,520, of which the present one is a division.

The purifier illustrated comprises a vertical tubular body $a$ closed at the top, and the lower end of which terminates a short distance above the surface of a body of liquid $d$ contained within a suitable receptacle. Within the lower end of the tube $a$ is arranged a conical deflector $c$ and with said tube at or near its top communicates a gas inlet duct or pipe $b$. The lower portion of the body $a$ is surrounded by a casing which is open at the bottom and extends beneath the surface of the liquid $d$; and with said casing communicates a gas delivery pipe $e$. Within the communicating ends of the tube $a$ and gas inlet pipe $b$ is situated an injector $f$, and liquid is supplied thereto through a pipe $g$. As before explained, according to this invention the liquid entering the purifier through the pipe $g$ as well as the gas supplied through a pipe $h$, is under such pressure that the spray produced by the mixing of said streams will by itself effect a separation of the particles of impurities from the body of gas.

Any suitable gas may be employed for producing the spray, the nature of that selected depending on the character of gas which is to be purified and the circumstances under which the process is to be carried out. In the purification of blast furnace gases, for example, it would not be practicable to employ either compressed air or carbon dioxid under pressure for producing the spray as the use of the former might create an explosive mixture and the latter would act to reduce the calorific properties of the gas. For such use it is preferable to employ as the spray creating medium blast-furnace gas, which may or may not have been previously purified. Therefore in the apparatus illustrated the pipe $h$ is connected with a compressor $k$ which is in turn connected with the gas delivery pipe $e$ of the purifier.

In the operation of the apparatus illustrated therefore a portion of the purified gas passing through the pipe $e$ will be withdrawn by the action of the compressor $k$ and forced through the pipe $h$ to be discharged into the injector $f$ simultaneously with a stream of water delivered by the pipe $g$. The expansion of the compressed gas acts to produce a very finely divided spray and a maximum agitation and intimate mixing of the spray with the gas entering the apparatus through the pipe $b$ so that the solid or liquid particles contained in the gas are absorbed by the spray to a much greater extent than by the methods heretofore in use. Owing to the deflector $c$ the gas is caused to leave the tube $a$ in the form of a thin sheet which has a high velocity and is directed against the body of liquid $d$ and in passing over the surface of said liquid $d$ the gas is freed from the saturated particles and passes to the pipe $e$ in a comparatively pure condition. It will be understood that prior to introducing the gas to the pipe $b$ it is caused to pass through a suitable "separator and scrubber", or apparatus by which the coarser impurities originally contained therein are removed so that the process herein described effects the final and complete purification. The pipe $e$ of course communicates with a suitable storage receptacle or an apparatus in which the purified gas is to be used.

While the process, as hereinbefore described, is particularly applicable for purifying gas derived from blast furnaces it will be evident that the atomizing of the liquid admitted through the pipe $g$ may be effected by any suitable gas which has been compressed to the required degree, the nature of the gas used for such purpose depending on the gas to be purified and the liquid which is to constitute the spray. For instance the process may be employed for purifying gas obtained from coke and other ovens. By this process also it is possible to collect the by-products of coke ovens or furnaces by properly treating the gases obtained therefrom. That is tar held in suspension in gas may be removed by the action of a tar spray, ammoniacal gas may be separated by the action of a spray of water, and benzol by the action of an oil spray, etc.

Among the important advantages of the improved process the following are noted:

(1) By the action of a relatively small quantity of compressed gas there is obtained a very complete atomizing of the liquid supplied to the purifier so that a spray having a high mechanical efficiency is produced.

(2) The expansion of the gas during the formation of the spray and the purifying operation acts to lower the temperature of the gas being treated and thereby reduces instead of increasing the amount of gas that is converted into vapor during the operation.

(3) As various gases may be used to produce the spray it is possible to use a gas of such character and quality as to materially assist in the purification. In the particular process described herein the gas for producing the spray is derived from the same source and is therefore of the same character as that which is treated.

It will be seen that the process or method herein described differs radically from those heretofore employed, in which the gas to be cleaned is caused to travel through a body of liquid. In such processes it has been customary to employ a spray produced by an injector, but the purpose or function of this spray has been simply to act as a conveyer or transmitting power for moving the gas through the cleaning apparatus and the body of liquid therein. That is, the spray employed in such process is not of itself sufficient to cause the separation of impurities from the gas, and it has been necessary, as hereinbefore noted, to also pass the gas through a body of liquid or wash it. According to the present invention, however, it will be seen that the spray itself constitutes the cleaning or purifying medium. Both the liquid and the gas, by which the spray is produced, are under such pressure that there is obtained a spray which so completely envelops and saturates the particles of impurities contained in the gas that they are separated from the gas solely by the action of the spray, without necessitating passing the gas through a body of liquid or subjecting it to the action of any other means, as has been required by the methods and processes heretofore employed.

Having thus described the invention what is claimed is:

1. The herein described process of purifying gas consisting in passing a body of gas through a suitable conduit and subjecting it therein to the action of a spray formed by combining streams of suitable liquid and gas which has passed through said conduit, both liquid and gas being under pressure, and causing the gas escaping from said conduit to pass over a body of liquid in the form of a thin sheet.

2. The herein described process of purifying gas consisting in subjecting a body of gas to the action of a spray formed by combining streams of siutable liquid and gas, both under pressure, and causing the gas saturated by said spray to pass over a body of liquid in the form of a thin sheet.

In testimony whereof I affix my signature in presence of two witnesses.

FRANÇOIS SEPULCHRE.

Witnesses:
EMILE DOR,
ALPH. LERUTH.